US010296499B2

(12) United States Patent
Borges et al.

(10) Patent No.: US 10,296,499 B2
(45) Date of Patent: May 21, 2019

(54) DYNAMIC DATABASE MAPPING

(71) Applicant: SAP SE, Walldorf (DE)

(72) Inventors: Matthew Borges, Kitchener (CA); Tim McClements, Wellesley (CA); Adam Hurst, Waterloo (CA)

(73) Assignee: SAP SE, Walldorf (DE)

( * ) Notice: Subject to any disclaimer, the term of this patent is extended or adjusted under 35 U.S.C. 154(b) by 551 days.

(21) Appl. No.: 14/080,951

(22) Filed: Nov. 15, 2013

(65) Prior Publication Data

US 2015/0142836 A1 May 21, 2015

(51) Int. Cl.
G06F 16/22 (2019.01)
G06F 17/30 (2006.01)

(52) U.S. Cl.
CPC .... *G06F 16/2282* (2019.01); *G06F 17/30339* (2013.01); *G06F 17/30569* (2013.01)

(58) Field of Classification Search
None
See application file for complete search history.

(56) References Cited

U.S. PATENT DOCUMENTS

| 7,467,018 | B1 * | 12/2008 | Callaghan | G05B 19/4186 |
| | | | | 700/1 |
| 7,707,230 | B1 * | 4/2010 | Brenner | G06F 17/30241 |
| | | | | 707/803 |
| 8,600,925 | B2 | 12/2013 | Vickers et al. | |
| 8,713,368 | B2 | 4/2014 | Lock | |
| 8,819,770 | B2 | 8/2014 | Entin et al. | |
| 2002/0059292 | A1 | 5/2002 | Velasco | |
| 2004/0163041 | A1 * | 8/2004 | Engel | G06F 17/30917 |
| | | | | 715/234 |
| 2005/0187974 | A1 * | 8/2005 | Gong | G06F 17/30563 |
| 2005/0234889 | A1 | 10/2005 | Fox et al. | |
| 2007/0050420 | A1 | 3/2007 | Sankruthi | |
| 2007/0074155 | A1 * | 3/2007 | Ama | G06F 17/30563 |
| | | | | 717/106 |
| 2007/0283011 | A1 * | 12/2007 | Rakowski | H04L 41/0803 |
| | | | | 709/225 |
| 2007/0294235 | A1 * | 12/2007 | Millett | G06F 17/30333 |
| 2011/0055352 | A1 * | 3/2011 | Choi | G06F 17/30861 |
| | | | | 709/219 |

(Continued)

OTHER PUBLICATIONS

"OData Delta Query Protocol Design," copyright Microsoft Corporation, Jun. 21, 2011, available from https://www.oasis-open.org/committees/download.php/47403/.*
Extended European Search Report for EP Application No. 14193101.4, dated Feb. 13, 2015.
EPO Communication dated Jan. 3, 2017 in corresponding EP 14193101.4.

(Continued)

*Primary Examiner* — Charles D Adams
(74) *Attorney, Agent, or Firm* — Jones Day

(57) ABSTRACT

A method for providing mapping between a first data model and a second data model may include sending a request for metadata to a data producer providing data using the second data model. The metadata may be received from the data producer and analyzed to determine a structure of the second data model. System tables may be created based on the analysis of the metadata. The system tables may include data tables to store data from the data producer and to provide the mapping between the metadata of the second data model and the data tables in the first data model. Requests may be made to the data producer for data to be retrieved and populated in the data tables using the first data model.

15 Claims, 5 Drawing Sheets

(56) References Cited

U.S. PATENT DOCUMENTS

| | | |
|---|---|---|
| 2012/0109937 A1* | 5/2012 | Liensberger .......... G06Q 10/10 707/722 |
| 2012/0246202 A1 | 9/2012 | Surtani et al. |
| 2012/0246334 A1 | 9/2012 | Yang et al. |
| 2013/0159530 A1 | 6/2013 | James et al. |
| 2013/0290880 A1 | 10/2013 | Wu et al. |
| 2013/0304799 A1 | 11/2013 | Lutter et al. |
| 2014/0006368 A1 | 1/2014 | Moser et al. |
| 2014/0149093 A1 | 5/2014 | Amulu |
| 2014/0250040 A1 | 9/2014 | Kieselbach et al. |
| 2014/0250121 A1 | 9/2014 | Kieselbach et al. |
| 2014/0279839 A1 | 9/2014 | Balzar et al. |

OTHER PUBLICATIONS

Anonymous, "Entity Framework—Wikipedia," Oct. 29, 2013 [XP055312429], Retrieved Oct. 19, 2016 from the Internet: URL:https://en.wikipedia.org/w/index/php?title=Entity_Framework&oldid=579367771.

Kim, Myung-Joon et al., "Automatic Relational Data Base Designs by Transformation of the Entity-Relationship Model," International Conference on Computers and Applications, Beijing, Jun. 23-27, 1987; International Conference on Computers and Applications, Washington, IEEE Computer Soc. Press US, vol. Conf. 2, Jun. 1, 1987, pp. 418-425 [XP000757320].

* cited by examiner

100

200

300

400

DYNAMIC DATABASE MAPPING

RELATED APPLICATIONS

This application is related to U.S. patent application Ser. No. 14/080,968 filed on Nov. 15, 2013, which is incorporated herein by reference in its entirety.

FIELD

The present disclosure relates generally to transferring data between data sources. More particularly, the present disclosure relates to systems and methods for providing data mappings between different data models and transferring data from one data model to another data model using the database mappings.

BACKGROUND

Data providers store data that is requested and used by users. The data model used to store the data by the data provider determines the logical structure of the database and how the data is stored, organized, retrieved and manipulated. Because data providers can use one of many available models, consumers of the data may find it difficult to access and use the needed data if they are using a different physical data model.

To allow users to receive data from data providers using different models, protocols have been developed to expose data from data providers using different models. The Open Data Protocol (OData) is an example of a protocol that can be used to expose data from different applications and stores.

While a protocol can expose data from different sources, the protocol does not provide a logical model used by the provider of the data. Thus, even with the protocols, consumers and providers of the data using different physical data models cannot effectively access and use the data for applications needing the logical model.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

SUMMARY

According to one exemplary aspect of the present disclosure, systems and methods provide mapping between a first data model and a second data model to allow devices using these models to effectively request and process data between themselves. The mapping may provide a single logical data model that can be used to request and process data between the first and second data models. A method for providing the mapping may include sending a request for metadata to a data producer providing data using the second data model. The metadata may be received from the data producer and analyzed to determine a structure of the second data model. The method may include creating system tables based on the analysis of the metadata. The system tables may include data tables using the first data model to store the data from the data producer, metadata tables to store the metadata from the data provider, and mapping tables providing the mapping between the metadata of the second data model and the data tables in the first data model. Requests may be made to the data producer for data to be retrieved and populated in the data tables using the first data model.

DETAILED DESCRIPTION

Figure 1:
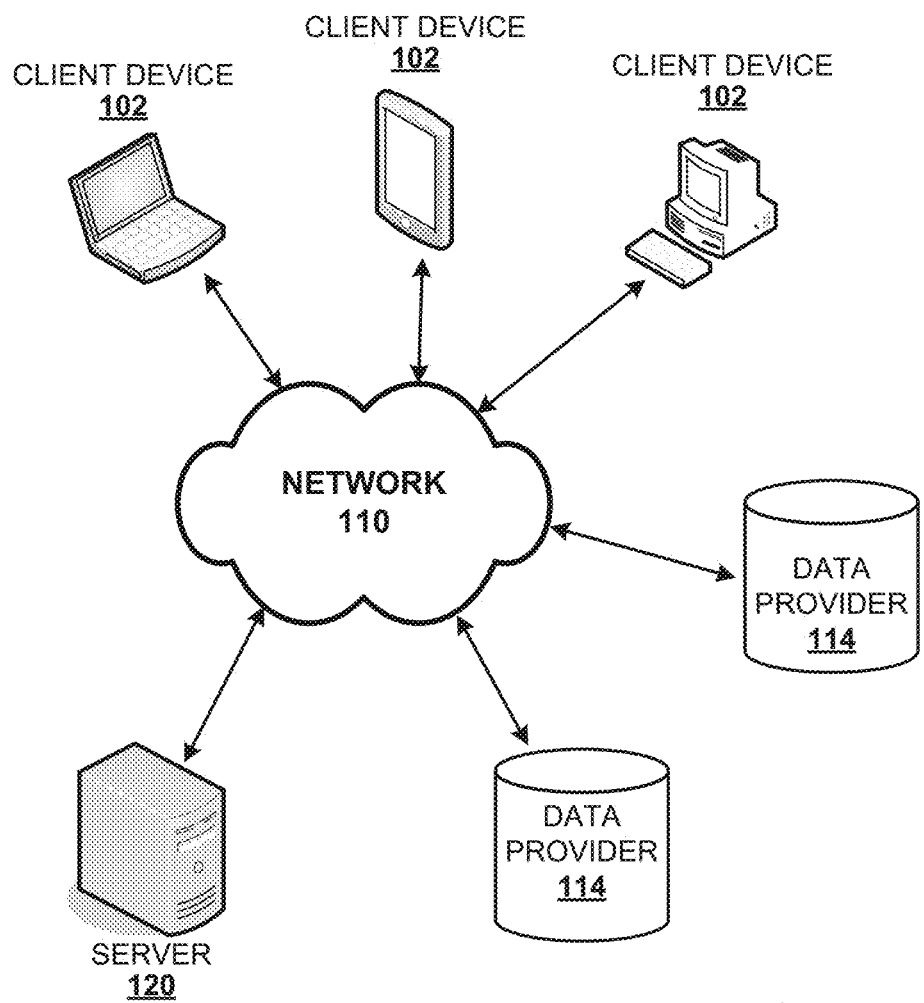
FIG. 1 is a block diagram illustrating an example embodiment of a networked environment in which a client device connects to one or more data providers via a network.

FIG. 1 is a block diagram illustrating an example embodiment of a networked environment 100 in which a client device 102 connects to one or more data providers 114 via a network 110. The client device 102 may connect to the data providers 114 via a server 120 connected to the network 110.

The client device 102 may request data from data sources maintained by the data providers 114. In one embodiment, the client device 102 may request a subset of master data maintained by one or more data providers 114. The client device 102 may request multiple subsets of data from a master data source maintained by different data providers 114. The data made available to the client device 102 by the data providers 114 may be specific to an application being executed on the client device 102 and/or specific to the data the user of the client device 102 is authorized to receive.

The data stored by the data provider 114 may be based on a model (e.g., object or hierarchical model) that is different from a model (e.g., relational model) used by the client device 102. For example, the data provider 114 may provide data based on a first physical data model and the client device may use a second physical data model, which is different from the first physical data mode. In one embodiment, the first data model may be a first database model and the second data model may be a second database model, which is different from the first database model. The protocol (e.g., Open Data Protocol (OData)) used to access the data from the data providers 114 may also provide data based on a model that is different from the model used by the client device 102. In one embodiment, the protocol used to communicate between the data provider 114 and the server 120 may be different from the protocol used to communicate between the server 120 and the client device 102. The different data models and/or protocols may make it difficult for users of the client devices 102 to access and manipulate the data provided by the data providers 114.

To allow the client device 102 to access and manipulate data received from the data provider 114, the client device 102 and/or the server 120 may perform mapping between a first data model used by the data provider 114 and a second data model used by the client device 102. While the physical data models used by the client device 102, the data provider 114 and/or the server 120 may be different, the mapping may provide the same logical model across multiple devices. The first data model may be a lightweight model used by the client device 102 or a model of the protocol used to communicate between the client device 102 and the server 120. The second data model may be a model used by the data provider 114 or a model of the protocol used to expose data provided by the data provider 114.

The mapping between the two models may include parsing metadata of the second data model to learn the structure of the second data model and creating a corresponding structure using the first data model that can store the data received from the data provider 114. The mapping between the two models may be performed by the server 120 and/or the client device 102. The mapping may be used by the client device 102 and/or the server 120 to communicate directly with the data provider 114. The mapping may also be used to synchronize the data stored in the client device 102 and the data provider 114. The mapping may preserve the logical model of the data provider 114 and allow for requests to be sent between the client device 102 and the data provider 114 using the first or the second model.

The client device 102 may execute applications provided on the client device 102 or may execute web-based applications provided by the server 120 via the network 110. The applications executed by the client device 102 may send and receive data to and from the server 120 and/or the data providers 114. The data may be generated, displayed and processed by the client device 102.

The server 120 may provide a staging area for the data before it is transferred to the client device 102 from the data provider 114. The server 120 may perform the data model mapping and may include a database to store the data to be transferred to the client device 102. The database in the server 120 may be an in-memory database (e.g., SAP® HANA database).

The network 110 may be an internal network, an external network or a plurality of different interconnected networks which may include the Internet. In one embodiment, the server 120 may connect to the data providers 114 via an external network and may connect to the client device 102 via an internal network.

The client device 102 may include, for example, a mobile device (e.g., mobile phone or a smart phone), a personal computer, a tablet, a terminal device, or a personal digital assistant (PDA). The client device 102 may include an input device (e.g., a touch screen, a touch pad, a mouse or a keyboard) to receive commands from the user. In one embodiment, the client device 102 may be a terminal that displays information provided by the server 120. The server 120 may send applications to be executed by the client device and/or send information to be displayed on the client devices 102 in response to commands issued at the client device 102.

The data provider 114 may be a data warehouse. The data warehouse may perform data cleaning, integration, transformation and refreshing. The data in the data warehouse may be exposed via the Open Data Protocol (OData). In general, OData is a Web protocol for requesting and updating data stored at the data provider 114. OData is operated by applying and budding upon Web technologies such as Hypertext Transfer Protocol (HTTP), Atom Publishing Protocol (AtomPub), and JavaScript® Object Notation (JSON) to provide access to information from a variety of applications, services, and stores. OData may be used to expose and access information from a variety of sources including, but not limited to, relational databases, file systems, content management systems and traditional Web sites.

In one embodiment, the client device 102 may use a relational database and OData may be used to expose data provided by the data provider 114. If data is transferred from the data provider 114 to the client device 102 via the server 120, the server 120 may include a Java OData component to communicate with the data provider 114 and a program to convert the OData model into the relational database used by the client device 102. The server 120 may include SYBASE MobiLink® synchronization technology to communicate with the data provider 114 and/or the client device 102. The server 120 may use OData metadata to build the relational data model and generate mapping from the OData to the relational model. The relational model and the mapping may be stored in the server 120 and transferred to the client device 102 upon request. The client device 102 may communicate with the server 120 via the MobiLink protocol and may include an SQL based application (e.g., SYBASE UltraLite® database technology) to process the data. SYBASE UltraLite® may provide a lightweight application designed for small-footprint mobile devices using relational databases.

Figure 2:
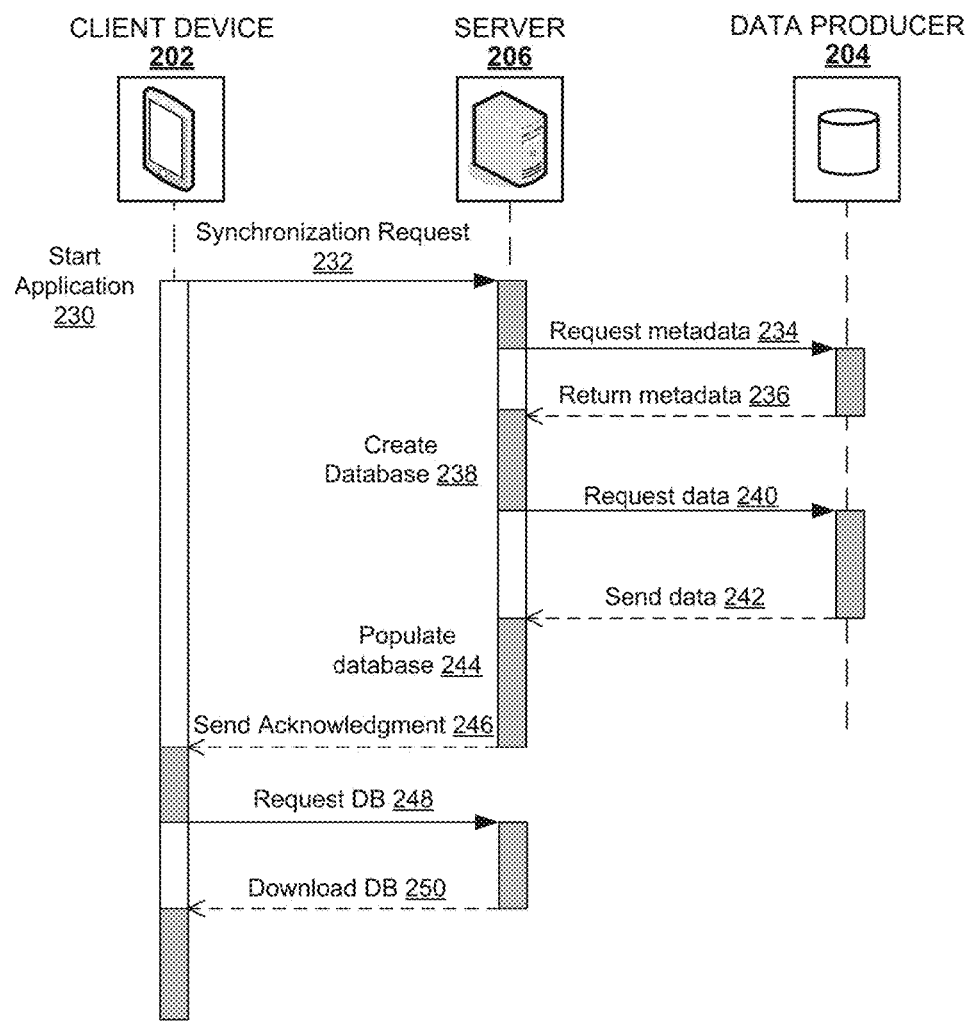
FIG. 2 illustrates a method for preparing and loading a database on a client device from a data producer according to an embodiment of the present disclosure.

FIG. 2 illustrates a method 200 for preparing and loading a database on a client device 202 from a data producer 204 according to an embodiment of the present disclosure. The client device 202 may use a first data model (e.g., first database model) that is different from a second data model (e.g., second database model) used to expose data in the data producer 204. The server 206 may generate the mapping between the first data model and the second data model. The protocol used to expose and update data from the data producer 204 may be different from the protocol used to transfer data between the client device 202 and the server 206. In one embodiment, the protocol used to expose data from the data producer 204 may be an online protocol (e.g., OData) and the protocol used to transfer data between the client device 202 and the data producer 204 may be an offline protocol (e.g., protocol provided by SYBASE SQL Anywhere MobiLink®).

The client device 202 may include one or more applications that use a subset of data stored by the data producer 204. When the application is started 230 on the client device 202, the client device 202 may not have a local database including the subset of data needed by the application. If the client device 202 does not include a local database, the client device 202 may create a skeletal template database.

The skeletal template database may include identification information provided by the user and/or the application. The skeletal template database may include a user information table, a defining request table, a delta counting table, and a metadata table. The user information table may store a user name and a password for users using the client device 202. The user information table may be used to connect to the data producer 204 and/or the server 206. The defining request table may initially store requests for entity sets that are wanted in the client database. If the data producer 204 supports delta change tracking, the defining requests in the defining request table may be updated to be delta requests. If the data producer 204 does not support delta change tracking, the requests in the defining request table may not be updated and the delta counting table may be updated and used to compute the changes in the server. The delta counting table may store keys used for the delta computations (e.g., when the initial download is requested). Thus, the delta counting table may count the number of successful delta refreshes made (e.g., how many times the client database is updated). The delta counting table may be used by the server when computing the changes rather than relying on the delta changes tracking provided by a data producer 204.

The metadata table may include metadata of data models used by data producer 204 and the client device 202. For example, the metadata table may include the metadata of the second data model used to expose data from the data producer 204. In one embodiment, the metadata table may include a first set of metadata tables storing the metadata of the second data model (e.g., as provided by the data producer 204) and a second set of metadata tables storing metadata of the data producer 204 broken up into a form that is readable and convertible into the data structure of the client device 202. The metadata table (e.g., the second set of metadata tables) may allow the client device 202 to map between the data stored on the client device 202 and the data model used by the data producer 204. The skeletal template database may be populated with identification information from the user and/or the application.

The client device 202 may issue a synchronization request 232 to the server 206. The synchronization request 232 may include the skeletal template database which includes user information (e.g., user name and password) and/or the data needed by the application (e.g., address of the data). The server 206 may make a determination of whether this is an initial synchronization request for the client device 202. If the synchronization request 232 is a first request, the server 206 may connect to the data producer 204 and request the metadata 234 of the database. The server 206 may use the user information and/or address of the data to connect to the data producer 204 and make the request for the metadata 234.

In response to the request, the data producer 204 may send the metadata 236 to the server 206. The metadata may include the metadata for the data model used by the data producer 204. The metadata may include a metadata document that contains a description of the feeds, types, properties and relationships. The metadata document may describe the data model (e.g., the structure and organization of all the resources). The data producer 204 may also provide a service document together with the metadata document. The service document may include lists of all the top-level feeds and the addresses of the feeds.

The server 206 may use the metadata of the second data model to create a database 238 to be used by the client device 202. The server 206 may create and populate the database 238 in the server and/or in the client device 202 to be used by the client device 202. Creating the database 238 may include the server 206 parsing and storing the metadata into an in-memory data structure. Based on the received metadata of the second data model, the server may create tables to store the data of the second data model and create tables providing mapping between the data models. The server 206 may store the skeletal template tables received from the client device 202, tables including metadata of the database, tables including the mapping between the first data model and the second data model, and the metadata of the second data model in the server memory (e.g., using the in-memory data structure).

After the database is created by the server 206, the server 206 may request data 240 to be sent from the data producer 204. The server 206 may issue the requests in the defining request table received from the client device 202. The server 206 may use OData to request data from the data producer 204. In response to the data request 240, the data producer may provide the data 242 to the server 206 and the server 206 may populate the database 244 with the received data. If multiple requests provide results in the same entity the update statements, instead of inserts, may be used to include the received data in the tables.

If the data producer 204 supports delta change tracking, which provide for retrieving changes to a given set of data, the requests and the responses may be include the delta links. If the data producer 204 does not support delta change tracking, the server 206 may keep track of the changes to the data stored on the client device 202.

Once the database is created and populated, acknowledgment can be sent 246 to the client device 202 indicating that the database is ready to be downloaded. The acknowledgement may include a path to the server database. The client device 202 may request the database 248 and download the database 250. The skeletal template database on the client device 202 may be replaced with the downloaded database.

The client device 202 may use the data in the downloaded database to perform operations using the data and make changes to the data in the downloaded database. The client device 202 may use the mapping data and the second data model metadata to map the metadata of the first data model into the second data model.

The data producer 204 and/or the server 206 may use server driven paging to transfer data. During server driven paging each interim page may include a link to the next page. The final page in the transfer may include a delta link for getting changes to the data.

In FIG. 2 it is important to note that additional and/or alternative component arrangements, interactions, etc. are easily possible. For example and inter alia a client device 202 may at various points/times communicate, interact, etc. directly with a data producer 204.

Creating the Database for the Client Device

Creating the database by the server 206 may include creating a plurality of system tables. The system tables may include a first set of tables including tables and columns that are generated to store the data from the data producer 204, a second set of tables including information about the metadata received from the data producer 204, and a third set of tables including the mapping between the first data model and the second data model.

The second set of tables including the metadata received from the data producer 204 may include entity sets, entity types, and navigation properties. The second set of tables may also include the metadata document and the service document received from the data producer 204.

The third set of tables including the mapping between the first data model and the second data model may include mapping of the second data model metadata to the physical, logical, etc. representation in the first data model. For example, the mapping may include that Table B will store data for an entity set X.

A library may be created by reading the plurality of system tables and creating in-memory data structures that store the information in the plurality of system tables. The library may be used by the client device 202 to issue requests to the database stored on the client device 202. The client device 202 may also use the library to communicate with the data producer 204. The server 206 may communicate with the data producer 204 using the logical model produced by the data producer 204.

Generating the Mapping

The mapping between the first data model (e.g., relational model) and the second data model (e.g., entity data model) may include mapping each entity set of the second data model to a table in the first data model. The entity set may include a group of entities consisting of named and typed properties. For example, a supplier entity set may include a set of supplier entity type instances.

Each entry in the second data model may represent a structured record with a key that has a list of properties of primitive or complex types. Each primitive property of an entity type may be mapped to a column in the table. Table 1 illustrates example of how primitive properties may be mapped to columns in the table.

TABLE 1

| Primitive Property | Description | Mapped Column |
|---|---|---|
| Edm.Binary | Represent fixed- or variable- length binary data | BINARY/LONG BINARY (depending on MaxLength) |
| Edm.Boolean | Represents the mathematical concept of binary-valued logic | BIT |
| Edm.Byte | Unsigned 8-bit integer value | TINYINT |
| Edm.DateTime | Represents date and time | TIMESTAMP |
| Edm.DateTimeOffset | Represents date and time as an Offset from GMT | TIMESTAMP WITH TIMEZONE |
| Edm.Decimal | Represents numeric values with fixed precision and scale. | DECIMAL/NUMBERIC |
| Edm.Double | Represents a floating point number with 15 digits precision | DOUBLE |
| Edm.GUID | Represents a 16-byte (128-bit) unique identifier value | UUID |
| Edm.INT16 | Represents a signed 16-bit integer value | SMALLINT |
| Edm.INT32 | Represents a signed 32-bit integer value | INTEGER |
| Edm.INT64 | Represents a signed 64-bit integer value | BIGINT |
| Edm.SBYTE | Represents a signed 8-bit integer value | SMALLINT |
| Edm.SINGLE | Represents a floating point number with 7 digits precision | FLOAT |
| Edm.String | Represents fixed- or variable-length character data | VARCHAR/LONG VARCHAR (depending on MaxLength) |
| Edm.Time | Represents the time of day | TIME |
| Edm.TimeOffset | Represents time as an Offset in minutes from GMT | TIME WITH TIMEZONE |

Other types of data (e.g., geographic data types and geometry data types) that may not be supported by the second data model may be mapped to LONG VARCHAR.

Named resource streams and media types in the second data model may be mapped to either a LONG BINARY or a LONG VARCHAR based on the media type in the first data model. The media resource may be an unstructured piece of data or stream (e.g., document, image or video) providing a media link entry with links to the media resource. The media link entry may include additional metadata about the media resource.

Keys of an entity type may be mapped to primary key columns of the corresponding entity type table. The keys may uniquely identify instances of the entity type and provide for relationship identification. The primary keys provide unique values to each table and do not contain NULL values.

In one embodiment, a table may be created for each entity type included in the metadata from the data producer 204. Each table may include extra columns to store which entity set the entity instance belongs to, and a globally unique entity ID hash. The entity ID can be generated by the server 206 or client device 202 and hashed. The entity ID may be generated based on the entity set and key properties of the entity type, as provided by the data producer 204. In another embodiment, the entity ID may be provided by the data producer 204. The hashed entity ID may be used as the key for the entity type tables. All relationship may be stored based on these hashed entity IDs. While the key properties of the entities types as defined by the data producer 204 may be stored in the database, other IDS may be used in the primary key columns of the corresponding tables in the client database.

Associations in the second data model may be mapped to an association table in the first dataset model. Associations in the second data model may define relationships between two or more entity types. For example, the association may define the relationship between supplier and products the supplier provides. Instances of associations may be grouped in association sets. The association table may include one column for each primary key of the corresponding entity types. The association table may include a foreign key for each of the entity type tables. The foreign key may be used to cross-reference related data across tables.

For example, if the second data model includes a first entity E1 with key properties e1_pk1 and e1_pk2, and a second entity E2 with key properties e2_pk1, e2_pk2, and e2_pk3, which are related using association A1, an association table A1 may be created in the first data model with columns e1_pk1, e1_pk2, e2_pk1, e2_pk2 and e2_pk3. A first foreign key from A1 to E1 may be included using columns e1_pk1 and e1_pk2, and a second foreign key from A1 to E2 may be included using columns e2_pk1, e2_pk2 and e2_pk3.

Collections in the second data model may be mapped to a collections table in the first data model. Collections may be a navigation property on an entity type that identifies a collection of entities. The collection may include a list that contains elements of primitive type or complex type. The collection table in the first data model may include one column for each primary key of the entity type the collection belongs too, with a foreign key (using these columns) to that entity type table. The rest of the column in the collection table may be determined by the type of collection. For a primitive type, the table may contain one extra column with a type mapping as described in primitive properties.

The complex type properties in the second data model may be mapped to a table in the first data model having the same name as the complex type. The complex types, which may include collections, may include a list of properties but with no key. Each row of the complex type table in the second data model may include a primary key column of the entity type the complex type is used with and a column for each property. The type in each property column may be mapped as described above with primitive properties. A foreign key may be included from the complex type table to the entity type table.

With the complex type table, if the same complex type is used by more than one entity type, a different complex type table may be included for each entity. In another embodiment, one complex type table may be created for each complex type in the metadata of the second data model. An autoincrement primary key column may be included in this embodiment. If the complex type is not used in a collection, then the entity type table may have one column for the complex type with a foreign key to the complex type table. If a collection table is needed, whether for complex type collection or primitive collection, the collection table may include a column for the entity IDs, identifying the entity for which the collection belongs.

Containment properties in the second data model may be mapped to containment tables in the first data model. Containment properties may provide for navigation properties and/or association. Similar to the association table, the containment table may include one column for each primary key of the corresponding entity types. The containment table may include a foreign key for each of the entity type tables. The foreign key may be used to cross-reference related data across the tables.

Entity type and complex types in the second data model may be derived from a base entity type and complex type, respectively. The base type may be where the key is defined. In one embodiment, the derived types may be accounted for in the second data model by including the base type properties in the tables for the derived types. No separate tables may be needed with this embodiment. In another embodiment, a base type table and a derived type table may be created for the mapping. The base type table and the derived type table may include key columns and the derived table may include a foreign key to the base table.

If the second data model supports entity tags (ETags), each entity table may include additional columns for the ETags. The ETags may be supported for entity types, named resources streams, and media resources. An entity type may include zero or more named resource streams and/or zero or one media resource. An additional column may be provided for each supported ETag of media resource, ETag of named resource streams, and an ETag for the entity.

A number of characters used for an entry in the second data model may exceed a number of characters used for an entry in the first data model. For example, the second data model (e.g., OData) may have a limit of 512 characters for namespace names and 480 characters for simple identifiers (e.g., names of entity type, entity sets and associations). The first data model (e.g., UltraLite data model) may have a limit of 128 characters. Because names in the second data model cannot be always translated directly to names in the first data model, names that would be longer than the limit (e.g., 128 characters), may be hashed to provide data with a number of characters below the limit of the first data model.

Figure 3:
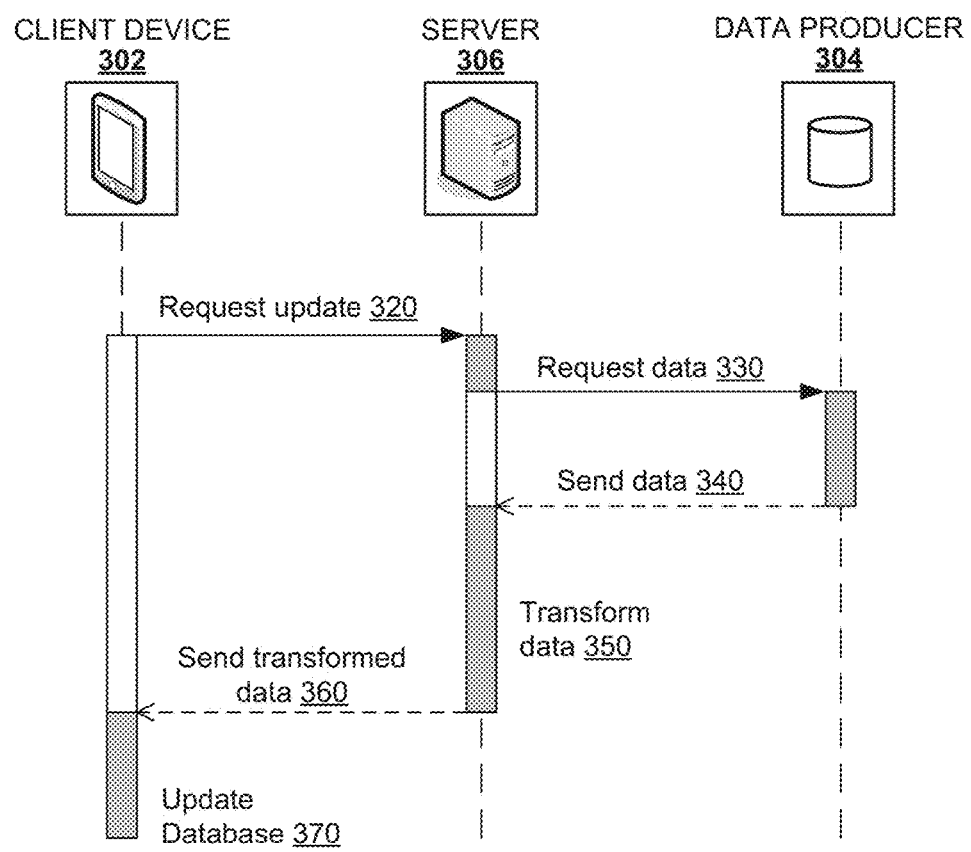
FIG. 3 illustrates a method for synchronizing a client database on the client device and a database maintained by a data producer according to an embodiment of the present disclosure.

FIG. 3 illustrates a method 300 for synchronizing a client database on the client device 302 and a database maintained by a data producer 304 according to an embodiment of the present disclosure. The client device 302 may use a first data model that is different from a second data model used to expose data in the data producer 304. A server 306 may analyze the metadata received from the data producer 304 and provide a mapping between the first data model and the second data model. The protocol used to expose the data from the data producer 304 may be different from the protocol used to transfer data between the client device 302 and the server 306.

The client device 302 may issue a request 320 to update the database stored on the client device 302. The request 320 may be a request to update the whole client database, or to update a portion of the client database. The request 320 may include sending a table including the user information, a request table and a delta counting table. The user table may store user names and passwords for users using the client device 302. The delta counting table may store keys used for delta computations.

In response to the request, the server 306 may request the data 330 from the data producer 304. The request 330 to the data producer 304 may be delta queries. The request 330 may include delta links to retrieve the changes. Based on the delta links the data producer 304 may send data 340 that has changed since the last request. The server 306 may parse received data from the data producer 304 and transform 350 the data into the data model used by the client device 302. The transformed data may be sent 360 to the client device 302 and the database may be updated 370 with the changes.

If the data producer 304 does not support deltas, the server 306 may determine the deltas for the data stored in the client database. The server 306 may periodically request data from the data producer 304 and update the data stored in the server 306. The changed data may be tracked and stored by the server 306. The changes may be sent to the client device 302, in a response to the request to update the client database.

Figure 4:
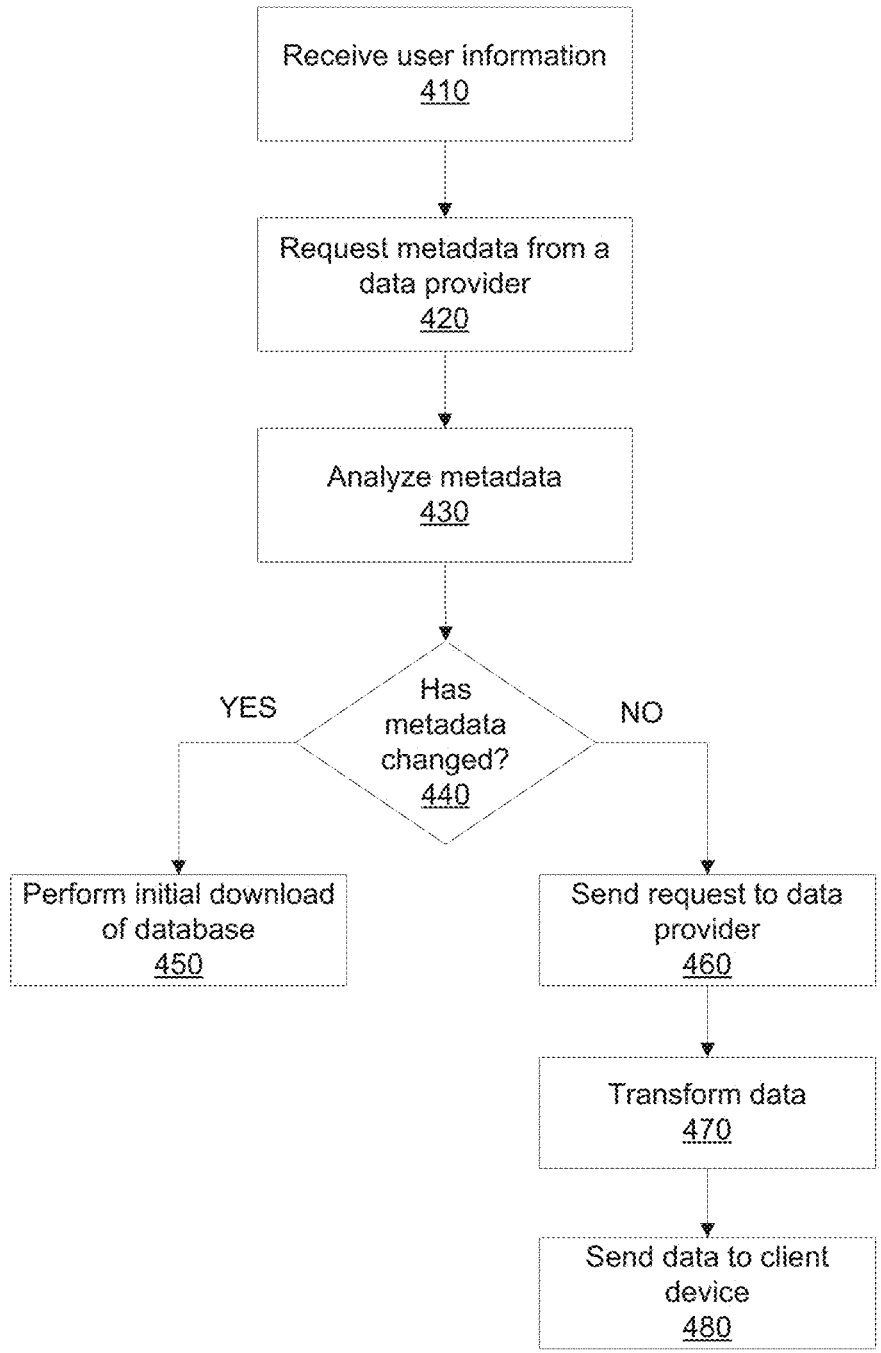
FIG. 4 illustrates a method for synchronizing a client database on the client device and a database maintained by a data producer according to another embodiment of the present disclosure.

FIG. 4 illustrates a method 400 for synchronizing a client database on the client device and a database maintained by a data producer according to another embodiment of the present disclosure. The method 400 may include receiving user information 410, requesting metadata from a data provider 420, analyzing the metadata 430, performing initial download 450 if the metadata has changed, sending a request for data to data provider if the metadata has not changed, transforming the requested data 470 and sending the data to the client device 480.

Receiving the user information 410 may include user information from a client device requesting an upload or synchronization of the client database. The user information may include the name and password of the user, the requests made to obtain the client database, and a delta counting table.

The server may request metadata from the data provider 420 to determine if the schema of the database has changed. The request 420 may be made using the user information and the requests received from the client device.

The metadata received from the data provider may be analyzed 430 to determine if the metadata has changed. The metadata document and/or the service document may be analyzed to make the determination. If the hash, the Etag, or the signature of the metadata has changed (Yes in step 440), the initial download of the database 450 may be performed by the server. As discussed above with reference to FIG. 2, the initial download may include analyzing the metadata and providing mapping between the model used by the data provider and the model used by the client device.

If the hash or the signature of the metadata has not changed (No in step 440), the requests for data from the data provider 460 may be made. The requests may include delta requests and retrieve requests. The delta request may include a delta link that can be used by the data provider to determine what changes have been made to the data since the data was last requested. The retrieve request may include a request to retrieve a feed, an entry or a service document. With the retrieve request a query may need to be made to determine changes that have been made to the requested data. For example, a query can be made to determine if changes have been made to the entities and the links. A temporary set of tables (e.g., entitytemp table and linkstemp table) may be generated in the server to help perform the query for the changes. The data received from the data provider may include a new delta token returned by the data provider.

The data received from the data provider may be transformed 470 from the model used to expose the data to the model used by the client device. The transformation may be made using the mapping discussed above with reference to FIG. 2. The transformed data may be stored in the server database and/or sent to the client device. In one embodiment, only the columns with changes are sent to the client device. In another embodiment, tables that include changes may be sent to the client device.

In one embodiment, the operations of the server and the client device may be performed by a single device (e.g., mobile device or a personal computer).

The first data model or the second data model may include one or a combination of models used to store and expose data. The data models may include logical data models or physical data models. The logical data models may include hierarchical database model, network model, relational model, entity-relationship model, enhanced entity-relationship model, object model, document model, entity-attribute-value model, and star schema. The physical data model may include inverted index or flat file. Other models may include associative model, multidimensional model, multivalue model, semantic model, DML database, named graph or triplestore.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 5:
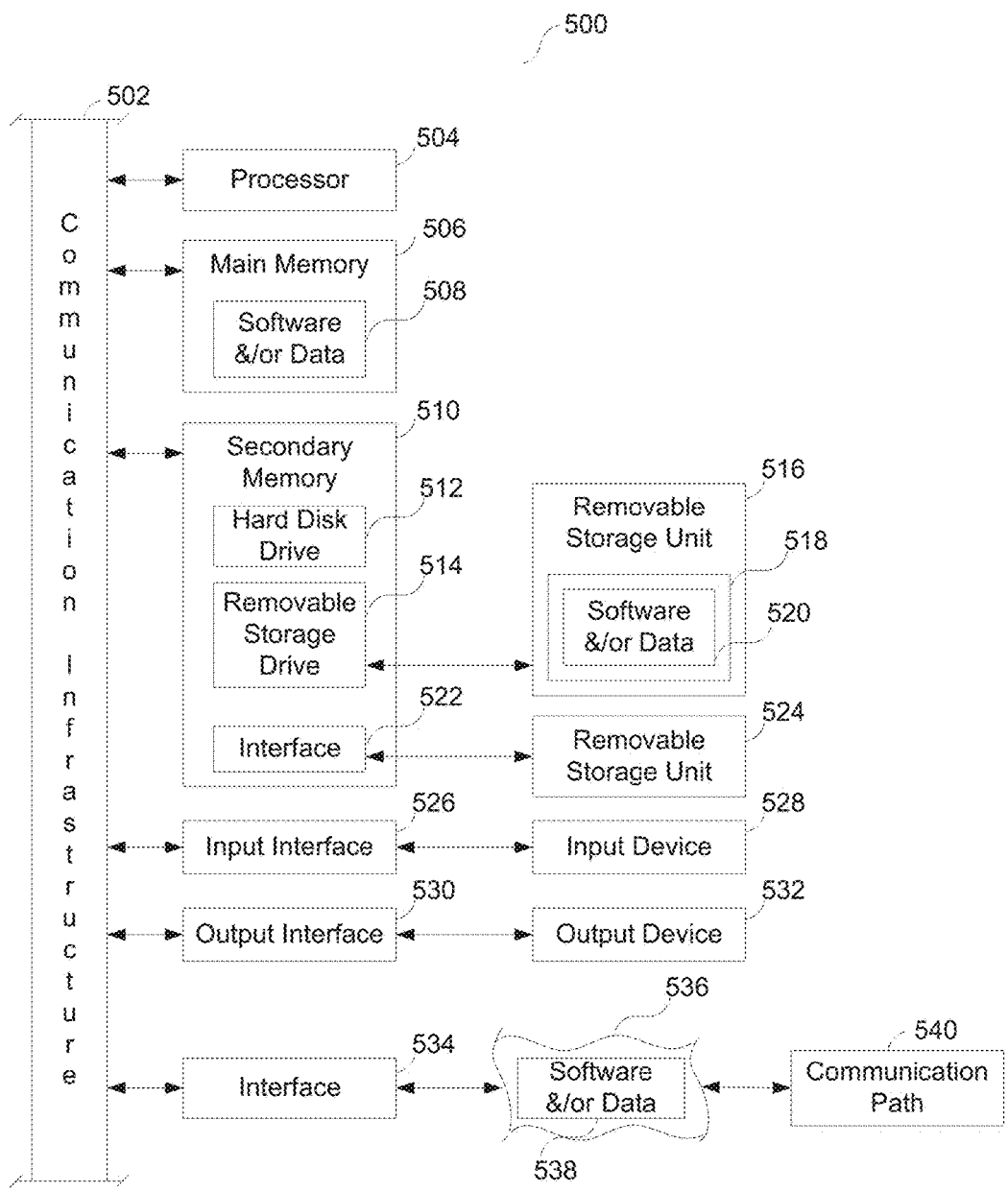
FIG. 5 illustrates an example computer system in which one or more embodiments of the present disclosure may be implemented as computer-readable code.

Aspects of the above may be implemented by software, firmware, hardware, or any combination thereof. FIG. 5 illustrates an example computer system 500 in which the above, or portions thereof, may be implemented as computer-readable code. Various embodiments of the above are described in terms of this example computer system 500.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Signals carried over communications path 540 can also embody the logic described herein. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present disclosure as discussed herein. In particular, the computer programs, when executed, enable processor 504 to implement the processes of aspects of the above. Accordingly, such computer programs represent controllers of the computer system 500. Where the disclosure is implemented using software, the software may be stored in a computer program product and loaded into computer system 500 using removable storage drive 514, interface 522, hard drive 512 or communications interface 534.

The disclosure is also directed to computer program products comprising software stored on any computer useable medium. Such software, when executed in one or more data processing devices, causes data processing device(s) to operate as described herein. Embodiments of the disclosure employ any computer useable or readable medium, known now or in the future.

Examples of computer readable storage media include, but are not limited to: primary and/or secondary devices, magnetic media, such as hard disks, floppy disks, Zip disks, tapes, and magnetic tape; optical media such as Compact Disc Read-Only Memory (CD-ROM) disks, DVDs and holographic devices; magneto-optical media; and hardware devices that are specially configured to store and execute, such as application-specific integrated circuits ("ASICs"), programmable logic devices ("PLDs") and ROM and RAM devices, Microelectromechanical Systems (MEMS), nano-technological storage device, etc.), and communication mediums (e.g., wired and wireless communications networks, local area networks, wide area networks, intranets, etc.). Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hard-wired circuitry in place of, or in combination with machine readable software instructions.

It is important to note that the particulars of FIG. 5 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

A data provider may be an information resource. A data provider may include sources of data that enable data storage and retrieval. A data provider may include databases, such as, relational, transactional, hierarchical, multi-dimensional (e.g., Online Analytic Processing—OLAP), object oriented databases, and the like. Further, a data provider may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. These data providers can include associated data foundations, semantic layers, management systems, security systems and so on. The data from the data provider may be exposed via the Open Data Protocol (OData).

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The layer may include logic associated with the underlying data allowing it to automatically formulate queries for execution against the underlying data sources. The logic includes connection to, structure for, and aspects of the data sources. Some semantic layers can be published, so that they can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, provides calculations associated with the underlying data.

In the above description, numerous specific details are set forth to provide a thorough understanding of embodiments of the disclosure. One skilled in the relevant art will recognize, however, that the various embodiments can be practiced without one or more of the specific details or with other methods, components, techniques, etc. In other instances, well-known operations or structures are not shown or described in detail to avoid obscuring aspects of the disclosure.

For simplicity of exposition, the term 'database' was employed in aspects of the above discussion. It will be readily apparent to one of ordinary skill in the art that in the context of the above discussion the scope of that term is not limited just to, for example, a database management system but rather encompasses inter alia any data source, data model, etc.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

The above descriptions and illustrations of embodiments of the disclosure, including what is described in the Abstract, is not intended to be exhaustive or to limit the embodiments to the precise forms disclosed. While specific embodiments of, and examples for, the embodiments are described herein for illustrative purposes, various equivalent modifications are possible within the scope of the disclosure, as those skilled in the relevant art will recognize. These modifications can be made to the embodiments in light of the above detailed description.

What is claimed is:

1. A method for generating a mapping between a first data model and a second data model, the method being implemented by one or more data processors forming part of at least one computing device and comprising:
sending, by a server, in response to a request from at least one client device, a request for metadata to a data producer providing data using the second data model, the data producer being remote from the client device, the server in communication with and remote from the data producer and the client device;
receiving, by the server, the metadata of the second data model and a service document from the data producer, the metadata comprising a description of feeds, types, properties, and relationships and the service document comprising lists of top-level feeds and addresses of the feeds;
parsing and analyzing, by the server, the metadata of the second data model into an in-memory database to determine a structure of the second data model;
based on the parsing and analysis of the metadata, creating, by the server and at the server, system tables, the system tables including a first set of tables for storing data from the data producer using the first data model, a second set of tables including information about the metadata of the second data model, and a third set of tables including a mapping between the metadata of the second data model and the first set of tables in the first data model;
populating the first set of tables with data received from the data producer;
sending the system tables to the client device; and
enabling, by the server, access to the system tables to the at least one client device;
wherein the first data model and the second data model are physical data models having different physical structures,
wherein a protocol used to communicate between the data producer and the server is different from the protocol used to communicate between the server and the at least one client device,
wherein containment properties in the second data model are mapped to containment tables in the first data model, containment tables include one column for each primary key of corresponding entity types,
wherein the data producer is an information resource that comprises a semantic layer,
wherein the mapping includes: an entity set and type of the second data model mapping to an entity table in the first data model; and properties of the entity type mapping to different columns in the table,
wherein the properties of the entity type mapping to the different columns in the table includes: each primitive property mapping to a different column; and keys of the entity mapping to a column in the table including entity ID hashes generated based on the entity set and key properties of the entity,
wherein the client device is operable to request an update to the data stored on the client device, the request including a delta link indicating when the data stored in the client device was requested from the data producer,
wherein the server is operable to receive the request for the update from the client device, to request data from the data producer using the delta link, to transform data received from the data producer into the first data model, and to send transformed data to the client device, and
wherein the server stores data in an in-memory data structure, data is transferred from the server using server driven paging in which each interim page includes a link to a next page, and a final page in a data transfer includes the delta link for obtaining changes to the data.

2. The method of claim 1, further comprising reading the system tables and creating an in-memory data structure using the system tables, in-memory data structure forming part of an in-memory database.

3. The method of claim 1, further comprising: requesting data from the data producer in a defining request table received from the client device; and populating the first set of tables with the data received from the data producer.

4. The method of claim 1, wherein the mapping includes: associations defining relationships between entity types in the second datable model mapping to an association table in the first data model; collections of an entity type in the second data model mapping to a collections table in the first data model; each complex type property in the second data model mapping to columns of the entity table of the entity which uses the complex type property.

5. The method of claim 1, wherein the entity table includes a column for entity tags (ETags) for at least one of a media resource or a named resource stream.

6. The method of claim 1, wherein the first data model is a relational database model and the second data model is an entity data model comprising at least one entity set,
wherein the method further comprises a mapping of each of the at least one entity set to a table in the first data model, the at least one entity set comprising a group of entities consisting of named and typed properties, and
wherein each entry in the second data model represents a structured record with a key, the structured record comprising a list of properties of primitive or complex type.

7. The method of claim 1, wherein a protocol used to request the metadata and data from the data producer is Open Data Protocol (OData).

8. The method of claim 1, wherein the request for metadata sent to the data producer includes a user identification and an associated password to access metadata and data from the data producer.

9. A system, comprising:
a data producer storing data;
a client device remote from the data producer executing an application using data stored in the client device based on a first data model, the data stored in the client device being data received from the data producer; and
a server in communication with and remote from the data producer and the client device, the server operable to:
receive requests from the client device to receive data from the data producer, the data producer providing data using a second data model;
in response to the client device request for data, request metadata and a service document from the data producer, the metadata comprising a description of feeds, types, properties, and relationships and the service document comprising lists of top-level feeds and addresses of the feeds;
parse and analyze the metadata into an in-memory database to determine a structure of the second data model;
create system tables based on the parsing and analysis, the system tables including data tables using the first data model to store the data from the data producer, metadata tables to store the metadata from the data producer and mapping tables providing a mapping between the metadata of the second data model and the data tables in the first data model;

request data from the data producer in a defining request table received from the client device;

populate data tables with the received data; and send the system tables to the client device, wherein the first data model and the second data model are physical data models having different physical structures, wherein a protocol used to communicate between the data producer and the server is different from the protocol used to communicate between the server and the client device, and wherein containment properties in the second data model are mapped to containment tables in the first data model, containment tables include one column for each primary key of corresponding entity types, wherein the mapping includes: an entity set and type of the second data model mapping to an entity table in the first data model; and properties of the entity type mapping to different columns in the table, and wherein the properties of the entity type mapping to the different columns in the table includes: each primitive property mapping to a different column; and keys of the entity mapping to a column in the table including entity ID hashes generated based on the entity set and key properties of the entity, wherein the client device is operable to request an update to the data stored on the client device, the request including a delta link indicating when the data stored in the client device was requested from the data producer, wherein the server is operable to receive the request for the update from the client device, to request data from the data producer using the delta link, to transform data received from the data producer into the first data model, and to send transformed data to the client device, and wherein the server stores data in an in-memory data structure, data is transferred from the server using server driven paging in which each interim page includes a link to a next page, and a final page in a data transfer includes the delta link for obtaining changes to the data.

10. The system of claim 9, wherein the first data model is a relational database model and the second data model is an entity data model comprising at least one entity set, wherein the method further comprises a mapping of each of the at least one entity set to a table in the first data model, the at least one entity set comprising a group of entities consisting of named and typed properties, and wherein each entry in the second data model represents a structured record with a key, the structured record comprising a list of properties of primitive or complex type.

11. The system of claim 9, wherein the server communicates with the client device using an offline protocol and communicates with the data producer using an online protocol based on the second data model.

12. The system of claim 9, wherein the mapping includes: associations defining relationships between entity types in the second data model mapping to an association table in the first data model; and collections of an entity type in the second data model mapping to a collections table in the first data model; each complex type property in the second data model mapping to columns of the entity table of the entity which uses the complex type property.

13. The system of claim 9, wherein the client device is operable to make requests based on the second data model using the mapping tables and the metadata tables.

14. The system of claim 9, wherein the client device is operable to request an update to the data stored on the client device, and the server is further operable to:

receive the request for the update from the client device;

request data from the data producer;

transform data received from the data producer into the first data model;

determine changes to the data based on the data stored in the server and the transformed data received from the data producer; and send changes to the client device.

15. A non-transitory computer readable medium containing program instructions, wherein execution of the program instructions by one or more processors of a computer system causes one or more processors to perform operations comprising:

sending, by a server, a request for metadata, in response to a request from a client device, to a data producer providing data using a second data model, which is different from a first data model used to store data by the client device, the server in communication with and remote from the data producer and the client device;

receiving, by the server, the metadata of the second data model and a service document from the data producer, the metadata comprising a description of feeds, types, properties, and relationships and the service document comprising lists of top-level feeds and addresses of the feeds;

parsing and analyzing, by the server, the metadata of the second data model into an in-memory database to determine a structure of the second data model;

creating, by the server, system tables based on the parsing and analysis, the system tables including data tables using the first data model to store the data from the data producer, metadata tables to store the metadata from the data producer and mapping tables providing a mapping between the metadata of the second data model and the data tables in the first data model;

requesting the data from the data producer for the data tables in a defining request table received from the client device;

populating the data tables with the data received from the data producer;

sending the system tables to the client device, and wherein the first data model and the second data model are physical data models having different physical structures, wherein a protocol used to communicate between the data producer and a server is different from the protocol used to communicate between the server and the client device, wherein containment properties in the second data model are mapped to containment tables in the first data model, containment tables include one column for each primary key of corresponding entity types, wherein the mapping includes: an entity set and type of the second data model mapping to an entity table in the first data model; and properties of the entity type mapping to different columns in the table, and wherein the properties of the entity type mapping to the different columns in the table includes: each primitive property mapping to a different column; and keys of the entity mapping to a column in the table including entity ID hashes generated based on the entity set and key properties of the entity, wherein the client device is operable to request an update to the data stored on the client device, the request including a delta link indicating when the data stored in the client device was requested from the data producer, wherein the server is operable to receive the request for the update from the client device, to request data from the data producer using the delta link, to transform data received from the data producer into the first data model, and to send transformed data to the client device, and wherein the server stores data in an in-memory data structure, data is transferred from the server using server driven paging in which each interim page includes a link to a next page, and a final page in a data transfer includes the delta link for obtaining changes to the data.

* * * * *